Patented Aug. 12, 1952

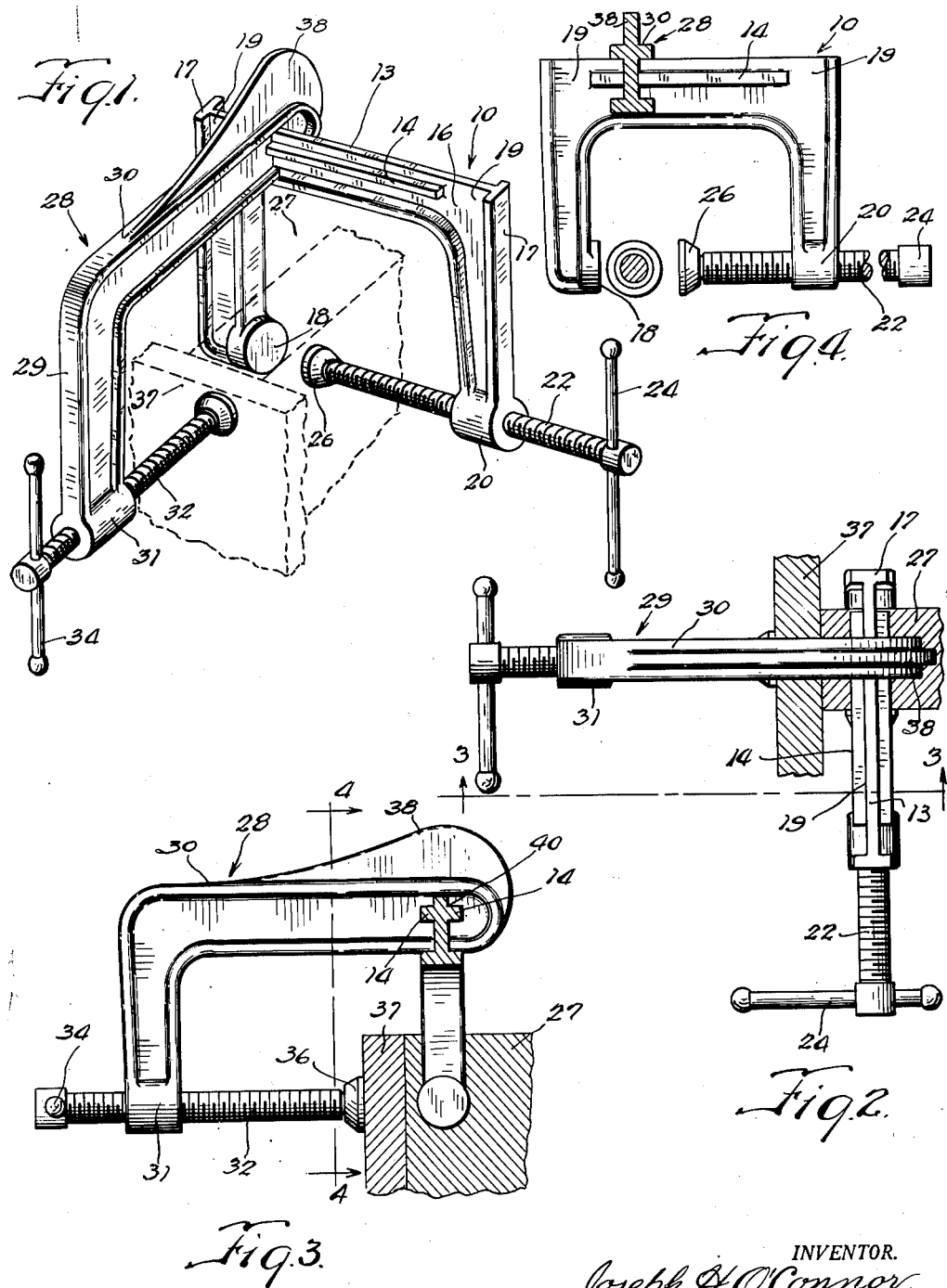

2,606,583

UNITED STATES PATENT OFFICE 2,606,583

CLAMPING FIXTURE WITH PRESSURE MEANS IN RIGHT ANGULARLY RELATED PLANES

Joseph H. O'Connor, Chicago, Ill.

Application August 20, 1948, Serial No. 45,409

2 Claims. (Cl. 144—297)

This invention relates to clamping means, and more particularly to clamping members for holding work in position for gluing, cementing, welding or for any other desired purposes.

One of the objects of this invention is to provide a pair of separate clamping units which may be readily attached to each other to jointly hold two or more pieces of work at approximately right angles to each other or in a T- or L-shaped relationship, and when said clamping units are separated, one of same may be operated as a conventional clamp.

Another object is to provide a pair of separate clamping members, one of said members functioning as a C-clamp and the other as an attachment thereto permitting work to be held and clamped at approximately right angles or any other angle to each other.

Another object is to provide a very simple and inexpensive manner of clamping and holding a plurality of work pieces at various angles to each other.

Other objects will become apparent as this description progresses.

In the drawings:

Fig. 1 is a perspective view showing my clamping members joined for holding the work in position, the work being indicated in dotted lines.

Fig. 2 is a top plan view of the same.

Fig. 3 is a side elevational view taken on line 3—3 of Fig. 2, and

Fig. 4 is a side elevational view taken on line 4—4 of Fig. 3.

The work holding members comprise a C-shaped clamp, generally indicated at 10, and an L-shaped attachable arm, generally indicated at 28.

The C-shaped clamp is substantially of conventional shape, similar to other C-shaped clamps and operates in the same manner, except that in my invention I provide a pair of ribs 14 on the clamp which permits attachment of the arm 28 to the clamp.

The clamp has a U-shaped frame 16, a fixed bearing surface 18 and an internally threaded hub 20 which receives a screw 22 operated by a handle 24. The opposite end of the screw carries a bearing plate 26 which is connected to the screw by a conventional ball and socket joint. The work 27 is clamped between the fixed bearing surface 18 and the movable bearing plate 26 as is well understood.

On the base 13 of the frame member 16 and running longitudinally thereof, I provide a pair of ribs 14, one on each side of the base of the frame member, which ribs are spaced slightly from the bottom edge and terminate short of the side flanges 17 of the frame to provide short spaces 19 adjacent the opposite ends of the ribs for insertion and connection of the L-shaped connecting arm 28, to be described.

The arm, generally indicated at 28, comprises a substantially L-shaped member having a vertical section 29 and a horizontal section 30. The vertical section has an internally threaded hub 31 for receiving a screw 32 operated by a handle 34. The opposite end of the screw carries a bearing plate 36 which is connected to the screw by the conventional ball and socket joint. The horizontal section 30 has a raised portion 38 for strengthening same.

Adjacent the outer end of the horizontal section 30, I provide a cross shaped keyway or slot 40, which keyway is positioned transversely to the longitudinal axis of the horizontal section 30.

The L-shaped arm 28 is detachably secured to the C-shaped clamping member 10 by positioning the arm so that the cross slot 40 engages the base 13 at either of the spaces 19 at the opposite ends of the ribs. The arm is then moved laterally with the slots 40 engaging the ribs 14 to secure the arm at right angles to the clamp 10. The bearing plate 36 is positioned transversely to the longitudinal axis of the C-shaped clamping member 10 and can retain work 37 adjacent the work 27 held by the C-shaped clamping member. Thus two pieces of work or material may be held in a T- or L-shaped relationship and worked on or held until the glue or other fastening means sets. While the arm 28 is positioned substantially at right angles to the C-shaped clamp the swivel bearing surfaces 26 and 36 and the free play between the cross slot 40 and the ribs 14 permits the arm 28 to be also positioned at an angle greater or less than a right angle and to clamp and hold work at such angles.

The arm 28 is slidable longitudinally on the clamp 10 and may be moved and positioned anywhere thereon. The arm 28 may also be secured to the C clamp to extend on either side of the C clamp, thus providing greater flexibility of operation. By providing a C-shaped clamp 10 which is to a large part of conventional design, the C clamp may be used separately and independently of the arm 28 in the same manner as a conventional C clamp is used and it has the additional advantage of permitting the arm 28 to be readily attached thereto to form an additional clamping construction.

It will be understood that various changes may be made without departing from the spirit and scope of my invention.

I claim:

1. A clamp of the character described comprising a U-shaped member including two legs and a longitudinal connecting portion, each of said legs having an abutment support mounted on the end thereof, an abutment at the end of each support, one of said abutment supports being a threaded shaft journalled in a threaded hub for movement toward and from the opposite abutment, an L-shaped member having one end in keyed sliding engagement with said connecting portion and disposed in a plane at a right angle to the plane of said U-shaped member, one of the legs of said L-shaped member having a threaded shaft journalled therein for movement toward and from the plane of the U-shaped member, said shaft carrying an abutment at one end thereof in confronting relation to the plane of said U-shaped member.

2. A clamp of the character described comprising a C-shaped clamping member, a substantially L-shaped clamping member disposed at a right angle to the longitudinal axis to said C-shaped clamping member and having one leg thereof in keyed sliding engagement with the longitudinal portion of said C-shaped clamping member, a threaded rod journalled in the other leg of said L-shaped clamping member and having an abutment at the end thereof disposed in confronting relation to the plane of said C-shaped clamping member.

JOSEPH H. O'CONNOR.

REFERENCES CITED

The following references are of record in the file of this patent:

UNITED STATES PATENTS

| Number | Name | Date |
| --- | --- | --- |
| 242,959 | Naglee | June 14, 1881 |
| 1,319,900 | Reeder | Oct. 28, 1919 |
| 1,788,546 | Schmieder | Jan. 13, 1931 |
| 2,366,350 | Ostling | Jan. 2, 1945 |

FOREIGN PATENTS

| Number | Country | Date |
| --- | --- | --- |
| 136,209 | Germany | Nov. 17, 1902 |